June 17, 1952 A. VOEDISCH 2,600,946
MOUNTING AND DEMOUNTING OF PULLEYS, GEARS, WHEELS, AND LIKE ELEMENTS
Filed Jan. 20, 1947

INVENTOR.
Alfred Voedisch
BY George W. Kennedy Jr.
Attorney

Patented June 17, 1952

2,600,946

UNITED STATES PATENT OFFICE 2,600,946

MOUNTING AND DEMOUNTING OF PULLEYS, GEARS, WHEELS, AND LIKE ELEMENTS

Alfred Voedisch, Worcester, Mass., assignor to The Heald Machine Company, Worcester, Mass., a corporation of Massachusetts Application January 20, 1947, Serial No. 723,118

6 Claims. (Cl. 287—53)

This invention relates to improvements, associated with a wheel, pulley, gear or similar torque-transmitting element, by which to force such an element, with the utmost tightness, onto a driving or driven shaft or spindle, and as readily to overcome such tightness, in the operation of withdrawing or removing the element from the shaft. In consequence, of such easy withdrawal or removal operation, there is no need for resort to hammering, prying or other forcing expedients that are liable to subject the parts to injury or strain.

My invention employs for these purposes a differential nut, whose arrangement and operation are such as to do away with all need for providing between shaft and element the usual spline, key or other equivalent connection that has heretofore been required for the operation, in this environment, of a differential nut. My invention provides the differential nut as a constituent and permanently connected part of the wheel, pulley, gear or other torque-transmitting element, thus not only obviating the difficulty, always heretofore encountered in applying a differential nut, of getting the second of the thread-engaging actions started, but also eliminating the danger of stripping or mutilating the threads, in the course of such starting manipulations.

Other and further objects and advantages of my invention will be made apparent by the following detailed description of same, taken in connection with the accompanying drawings in which Fig. 1 is a side elevational view showing a pulley secured to a shaft in accordance with my invention.

Like reference characters refer to like parts in the different figures.

Figure 1:
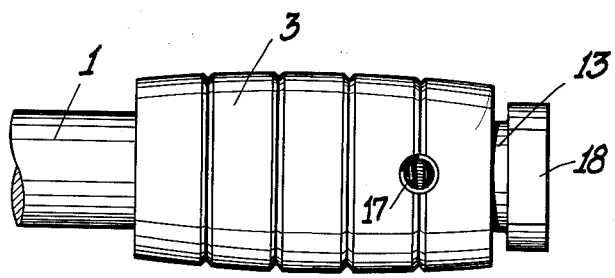
Figure 2:
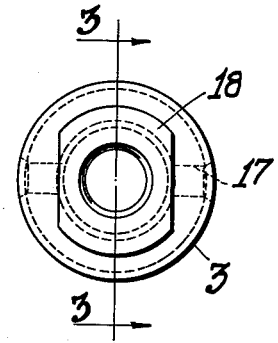
Fig. 2 is an end view of the parts shown in Fig. 1.

The drawings show a driving or driven shaft 1, which at one end is suitably tapered, as shown at 2, for the reception thereon of any torque-transmitting or similar element, here shown as a pulley 3, whose considerable attachment to said shaft is desired. For that purpose the pulley 3 for a major portion of its length is taper bored, reamed or otherwise finished with an internal taper as shown at 4, to fit accurately on the tapered portion 2 of shaft 1.

Beyond said tapered portion 2, the shaft 1 has a reduced-diameter portion 5, the end of which provides external screw threads 6 of relatively coarse pitch. The bore of pulley 3 (or other element to be attached to the shaft 1) at the smaller and outer end of its tapered portion 4 is enlarged appreciably, as shown at 7, by virtue of which is formed in said bore an annular shoulder 8 that serves, as hereinafter described, as an abutment for the end of a coil spring 9, the latter being received in said enlarged bore portion 7. The extreme outer end of bore enlargement 7 provides internal screw threads 10 of somewhat finer pitch, as shown, than the shaft threads 6, and inwardly of said threads 10 the diameter of said bore portion 7 is still further increased by a shallow internal groove 11, whose outer wall forms an annular shoulder 12 at the inner end of the screw threads 10.

Figure 3:
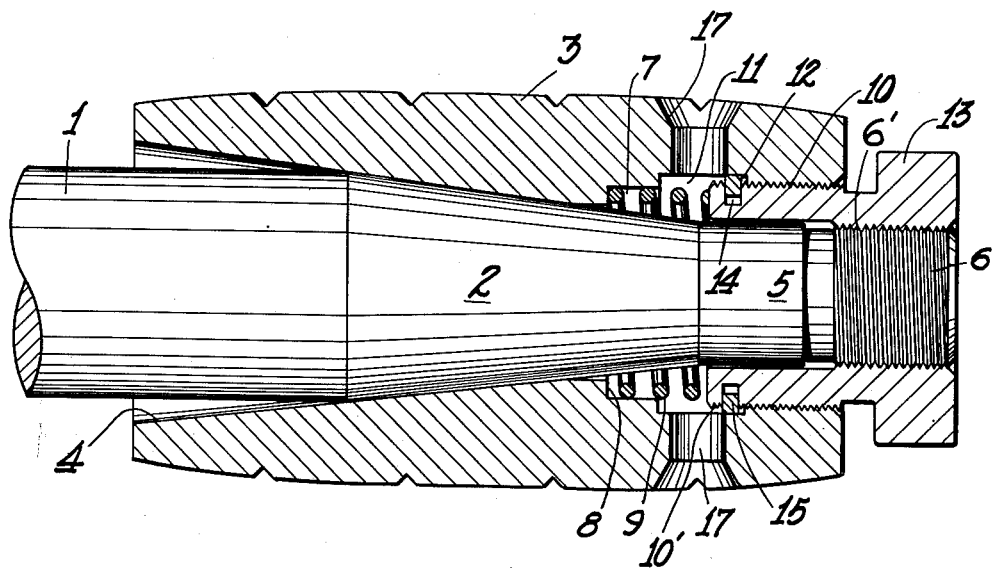
Fig. 3 is a sectional view, on line 3—3 of Fig. 2, showing the parts on a larger scale.

For cooperation with the external screw threads 6 of shaft 1 and the finer internal screw threads 10 of element 3, I provide a differential nut 13, having interior and exterior screw threads 6' and 10', respectively pitched to correspond to and to engage with the threads 6 on shaft 1 and the threads 10 on element 3. When the nut 13 is screwed into the element 3, for assembling said parts together preparatory to their presentation as a unit to the shaft or spindle 1, the inner end of said nut is adapted to press against the outer end of the aforesaid coil spring 9, whose other end seats against the shoulder 8; at a short distance from its inner end the nut 13 is formed with a circumferential groove 14 of sufficient depth to completely receive a split expansible spring ring or washer 15 (see Fig. 4) upon the latter's being contracted to a diameter smaller than its normal diameter. Said ring or washer 15 upon resumption of its normal diameter is adapted as shown in Fig. 3 to project into the shallow groove 11 of bore enlargement 7, the said ring 15 thus serving, when so positioned and allowed to expand to its normal diameter, as a locking means to maintain the element 3, spring 9 and nut 13 in a permanently assembled relation.

Figure 4:
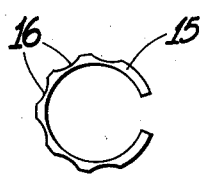
Fig. 4 is a side elevational view showing a locking ring employed by my invention.

That is to say, my invention contemplates the substantially permanent pre-assemblage with each pulley or other element 3, of its contained spring 9 and its associated nut 13 and locking ring 15, this assemblage being accomplished, after spring 9 is dropped into bore enlargement 7, by screwing the nut 13 (with ring 15 contracted by entry into threaded bore portion 10) far enough into said threaded bore portion 10, for said ring to pass the shoulder 12, whereupon said ring expands outwardly into bore groove 11 of element 3, and thereafter by its contact with shoulder 12, prevents said nut 13 from being withdrawn, by subsequent outward screwing, from the pulley or other element 3. In this locked-together assemblage of the parts, the spring 9 is put under more or less compression between shoulder 8 and the end of nut 13, and thus imposes a preload on the interengaged threads 10, 10' so as to create an appreciable resistance to relative turning movement between the pulley or other element 3 and its associated nut 13. As shown in Fig. 4, the outer circumference of locking ring 15 is preferably relieved at a number of places 16, 16 to permit said ring, in the above described operation of creating a permanent assembly of the parts to yield more freely in passing through the internal threads 10 of the element 3.

In the operation and use of my invention, the aforesaid permanent assembly (element 3, with its contained spring 9, locking ring 15 and nut 13) is moved inwardly on shaft 1 until the nut threads 6' engage the shaft threads 6; then the assembly is screwed inwardly as a unit by hand through the interaction of these matching thread portions, with no relative movement occurring at this time between element 3 and nut 13, because of the frictional pre-load imposed on the threads 10, 10' by spring 9. This screwing-in action, wholly on the threads 6 and 6', is continued until the tapered surfaces 4 and 2 are brought into firm contact; thereupon by a bar or pin (not shown) inserted in one of the radial holes 17, 17 of element 3, and by a wrench (not shown) applied to the head 18 of nut 13, the operator produces an inward screwing of nut 13 on both sets of threads 6, 6' and 10, 10' at once; since the threads 6, 6' are more rapid in operation than the threads 10, 10', this relative turning between nut 13 and element 3 produces, differentially, a slow and therefore very powerful endwise inward thrust of element 3, to force its internal tapered surface 4 into the tightest possible binding engagement with the tapered portion 2 of shaft 1, thus firmly uniting said parts for their desired rotation in unison.

In order to effect removal of the element 3 from the shaft 1, the bar and wrench are engaged with said element and with the nut 13 respectively, as before, but this time are manipulated for an unscrewing action of the nut 13 on both sets of threads at once, so as to produce differentially a powerful force that moves the element 3 outwardly on the shaft, just enough to relieve the pressure of the taper bore portion 4 against the tapered shaft section 2. Then, it is possible to remove the assembly as the unit from the shaft, by an unscrewing movement that simply involves travel of the nut threads 6' on the shaft threads 6.

Previous utilizations of a differential nut for the secure attachment of a wheel, gear, pulley or similar element to a shaft or spindle as typified by the disclosure of Bassett Patent No. 454,019, dated June 16, 1891, have always required the use of a key or spline between said shaft and said element in order to hold the element to an endwise movement during the differential action of the nut, and the presence of such a key has in turn prevented any pre-assembly temporary or permanent, of element and differential nut for their presentation as a unit, in initially threaded-together engagement, to the shaft or spindle. In consequence of this, it has always been necessary, when using a differential nut in this environment, to apply the nut after the placement of the element on the shaft, the nut being initially screwed inwardly on the shaft threads and then with much difficulty caused to engage by its finer external threads with the internal threads of the already-positioned torque-transmitting or other element, which by the presence of the aforesaid key or spline, is not susceptible of being turned or manipulated on the shaft, to position its threads for the easy entrance of the nut threads. This difficulty, which exposes said finer threads to stripping and mutilation is entirely overcome by my invention, which allows the element and the differential nut to be presented to the shaft in already-assembled relation.

I make no claim to use of a differential nut in the manner shown and described by the aforesaid Bassett patent, but what I do claim and desire to secure by Letters Patent is:

1. As a means of tightly attaching a wheel, pulley, gear or other torque-transmitting element to a shaft or spindle, a differential nut pre-assembled with said element, by interengaged screw threads of nut and element respectively, resilient means carried by said nut and operable in response to such pre-assembly for locking said element and said nut against dis-assembly, and spring means for creating a frictional resistance against relative turning between said parts on said first-mentioned threads, said nut having coarser screw threads adapted for interengagement, upon application of said assembly to said shaft, with corresponding shaft threads.

2. For the keyless attachment to a shaft or spindle, of a wheel, pulley, gear or other torque-transmitting element, a differential nut having internal screw threads adapted to be engaged with corresponding external threads on said shaft, said nut being presented to said shaft as a permanently-connected part of said element and in interengagement with said element by finer screw threads, and spring means for frictionally resisting relative turning movements between element and nut on their interengaged fine threads.

3. A torque-transmitting element bored for tight fit on a shaft or spindle, and having assembled therewith a differential nut having differently-pitched threads, the coarser threads adapted upon application of said assembly to said shaft to inter-engage with corresponding threads on said shaft and the finer nut threads, for said assembly being screwed into corresponding threads on said element, resilient means carried by said nut for locking said nut and said element in permanently assembled relation, and spring means for imposing a resistance to relative turning movement between element and nut on said finer threads.

4. The combination with a tapered shaft or spindle having a threaded outer end and a wheel pulley gear or other like element which is taper-bored to fit said shaft, of a differential nut providing internal threads to screw onto said shaft threads, and having finer external threads by which to screw same into corresponding internal threads of said element, and means responsive to the last-named screwing action in the pre-assemblage of element and nut, for imposing a frictional pre-load on said interengaged finer threads, to secure turning movement of nut and element in unison, when said assemblage is applied to said shaft, and moved endwise thereon by the turning of the nut's internal threads on said shaft threads.

5. The combination with a shaft having a tapered section and a threaded end beyond said taper, of a wheel, pulley, gear or like element having a tapered bore to fit said tapered shaft, and having beyond said tapered bore an internally threaded recess, said recess threads being of finer pitch than said shaft threads, a differential nut pre-assembled with said element and operable to force the tapered surfaces of element and shaft into close contact, said nut having internal threads for co-operation with said shaft threads and external threads for co-operation with said recess threads, and a spring seated in said recess, and put under compression by the screwing of said nut into said element, thereby to impose by said pre-assembly a frictional pre-load on the last-named co-operating threads.

6. The combination with a shaft having a tapered section and a threaded end beyond said taper, of a wheel, pulley, gear or like element having a tapered bore to fit said tapered shaft, and having beyond said tapered bore an internally threaded recess, said recess threads being of finer pitch than said shaft threads, a differential nut pre-assembled with said element and operable to force the tapered surfaces of element and shaft into close contact, said nut having internal threads for co-operation with said shaft threads and external threads for co-operation with said recess threads, and a spring seated in said recess, and put under compression by the screwing of said nut into said element, thereby to impose by said pre-assembly a frictional pre-load on the last-named co-operating threads and means responsive to such inward screwing for locking said parts against dis-assembly.

ALFRED VOEDISCH.

REFERENCES CITED

The following references are of record in the file of this patent:

UNITED STATES PATENTS

| Number | Name | Date |
| --- | --- | --- |
| 236,407 | Anthony | Jan. 11, 1881 |
| 385,798 | Firth | July 10, 1888 |
| 454,019 | Bassett | June 16, 1891 |
| 1,403,773 | Hanson | Jan. 17, 1922 |
| 1,437,471 | Kirkham | Dec. 5, 1922 |
| 1,604,690 | Halaby | Oct. 26, 1926 |
| 1,685,686 | Smith | Sept. 25, 1928 |
| 1,799,884 | Chantry | Apr. 7, 1931 |